United States Patent
Rakesh et al.

(10) Patent No.: US 11,263,082 B2
(45) Date of Patent: Mar. 1, 2022

(54) DATA RECOVERY OF GUEST VIRTUAL MACHINES

(71) Applicant: EMC IP Holding Company LLC, Hopkinton, MA (US)

(72) Inventors: Aaditya Rakesh, Bangalore (IN); Sudha Hebsur, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 107 days.

(21) Appl. No.: 16/150,745

(22) Filed: Oct. 3, 2018

(65) Prior Publication Data

US 2020/0110666 A1 Apr. 9, 2020

(51) Int. Cl.
*G06F 11/14* (2006.01)
*G06F 9/455* (2018.01)
*G06F 12/02* (2006.01)

(52) U.S. Cl.
CPC ...... *G06F 11/1415* (2013.01); *G06F 9/45558* (2013.01); *G06F 11/1448* (2013.01); *G06F 11/1469* (2013.01); *G06F 11/1471* (2013.01); *G06F 12/0292* (2013.01); *G06F 2009/45562* (2013.01)

(58) Field of Classification Search
CPC ............ G06F 9/45558; G06F 11/1415; G06F 11/1448; G06F 11/1469; G06F 11/1471; G06F 12/0292; G06F 2009/45562
USPC .......................................................... 718/1
See application file for complete search history.

(56) References Cited

U.S. PATENT DOCUMENTS

| | | | | |
|---|---|---|---|---|
| 9,092,248 | B1* | 7/2015 | Makin ................. | G06F 11/1402 |
| 9,201,887 | B1* | 12/2015 | Earl .................... | G06F 11/1451 |
| 9,507,673 | B1* | 11/2016 | Rangapuram ....... | G06F 11/1469 |
| 9,678,683 | B1* | 6/2017 | Chen .......................... | G06F 9/50 |
| 9,766,825 | B2* | 9/2017 | Bhagi ................... | G06F 3/0665 |
| 9,965,357 | B1* | 5/2018 | Earl .................... | G06F 11/1451 |
| 10,055,303 | B1* | 8/2018 | Kumar ................ | G06F 16/1727 |
| 10,114,705 | B1* | 10/2018 | Kumar ................ | G06F 11/1469 |
| 10,152,387 | B1* | 12/2018 | Chakraborty ....... | G06F 9/45558 |
| 2005/0216788 | A1* | 9/2005 | Mani-Meitav ...... | G06F 11/1464 714/6.32 |

(Continued)

OTHER PUBLICATIONS

A. Agrrawal, R. Shankar, S. Akarsh and P. Madan, "File System Aware Storage Virtualization Management," 2012 IEEE International Conference on Cloud Computing in Emerging Markets (CCEM), 2012, pp. 1-11, doi: 10.1109/CCEM.2012.6354608. (Year: 2012).*

*Primary Examiner* — Andrew M. Lyons
(74) *Attorney, Agent, or Firm* — Womble Bond Dickinson (US) LLP (57) ABSTRACT

A method of performing data recovery of a first virtual machine (VM) hosted on a first hypervisor to a second hypervisor that is different from the first hypervisor is provided. The method identifies information indicating format of a first virtual disk in a backup of the first VM, and creates a second virtual disk using the information indicating format of the first virtual disk. The method also accesses information indicating configuration of the first VM and metadata of the first virtual disk, and creates a second VM hosted on the second hypervisor using the information indicating configuration of the first VM and the metadata of the first virtual disk. The method further attaches the second virtual disk to the second VM.

22 Claims, 4 Drawing Sheets

(56) References Cited

U.S. PATENT DOCUMENTS

| | | | |
|---|---|---|---|
| 2010/0070725 A1* | 3/2010 | Prahlad | G06F 11/1453 711/162 |
| 2012/0017114 A1* | 1/2012 | Timashev | G06F 11/1451 714/15 |
| 2015/0293817 A1* | 10/2015 | Subramanian | G06F 11/1448 707/645 |
| 2015/0324217 A1* | 11/2015 | Shilmover | G06F 9/45558 718/1 |
| 2016/0070623 A1* | 3/2016 | Derk | G06F 11/1451 714/6.23 |
| 2016/0085574 A1* | 3/2016 | Dornemann | G06F 3/0605 718/1 |
| 2016/0085575 A1* | 3/2016 | Dornemann | G06F 11/1458 718/1 |
| 2016/0085636 A1* | 3/2016 | Dornemann | G06F 11/1469 707/679 |
| 2017/0116088 A1* | 4/2017 | Anami | G06F 3/0643 |
| 2017/0262307 A1* | 9/2017 | Venkatesh | G06F 9/45533 |
| 2017/0315739 A1* | 11/2017 | Ratra | G06F 3/0619 |
| 2017/0371749 A1* | 12/2017 | Devitt-Carolan | G06F 11/1658 |
| 2018/0018109 A1* | 1/2018 | Mueller | G06F 9/4401 |
| 2018/0032366 A1* | 2/2018 | Lemanski | G06F 9/45558 |
| 2018/0253361 A1* | 9/2018 | Dhatrak | G06F 11/1469 |
| 2019/0250827 A1* | 8/2019 | Gutta | G06F 3/065 |
| 2019/0286530 A1* | 9/2019 | Talley | G06F 9/45558 |

\* cited by examiner

DATA RECOVERY OF GUEST VIRTUAL MACHINES

TECHNOLOGICAL FIELD

The present disclosure relates generally to data recovery of guest virtual machines, and in particular, to data recovery of guest virtual machines hosted on one hypervisor to a different hypervisor.

BACKGROUND

A hypervisor or virtual machine monitor (VMM) is computer software, firmware or hardware that creates and runs virtual machines (VMs). A computer on which a hypervisor runs one or more VMs can be a server (also can be referred to as a host machine), and each VM hosted by the hypervisor can be referred to as a guest machine or guest VM. Users of VMs may use or deploy different hypervisors for different purposes. For example, a user may use a Microsoft Hyper-V hypervisor to host guest VMs with Windows operating system (OS), and may use a VMware ESXi hypervisor to host guest VMs with Linux OS. The user may need different applications to perform backup and recovery of guest VMs hosted on different hypervisors. The user may need to recover a backed up guest VM hosted on a Microsoft Hyper-V hypervisor to a VMware ESXi hypervisor.

Guest VMs hosted on a particular hypervisor are strongly linked to the particular hypervisor. Currently, there are existing solutions using third party tools to recover a backed up guest VM hosted on a source hypervisor to a different destination hypervisor. However, these solutions may require that the disk(s) of the backed up guest VM to be copied to the destination hypervisor before or after data conversion. Also, the user may have to create a new VM on the destination hypervisor with different configuration data. Moreover, there is no solution that allows the user to recover the backed up guest VM to any kind of destination hypervisor, irrespective of the source hypervisor hosting the guest VM.

Therefore, it would be desirable to have a system and method that takes into account at least some of the issues discussed above, as well as other possible issues.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Example implementations of the present disclosure are generally directed to data recovery of guest virtual machines, and in particular, to data recovery of guest virtual machines hosted on one hypervisor to a different hypervisor. Example implementations can provide data recovery of a guest VM hosted on a source hypervisor to a destination hypervisor that is different from the source hypervisor. The destination hypervisor may have a different type, a different format, and/or a different brand from the source hypervisor. Example implementations can allow a user to recover a backed up guest VM to any kind of destination hypervisor, irrespective of the source hypervisor originally hosting the guest VM.

In one example implementation, a user can recover a guest VM originally hosted on a VMware ESXi hypervisor to a Microsoft Hyper-V hypervisor and vice versa. The guest VM hosted on a VMware ESXi hypervisor may have configuration files in the format of .vmx, and virtual hard disk in the format of .vmdk. The recovered guest VM hosted on a Microsoft Hyper-V hypervisor may have configuration files in the format of .xml, .vmcx, .vmrs, .bin, or .vsv, and virtual hard disk in the format of .vhd or .vhdx.

In one example implementation, the format specification of .vmdk, .vhd and .vhdx and other virtual disk formats specific to different hypervisors may be available. Based on the available format specification, data blocks of a virtual disk of one format can be converted a new virtual disk of another format. Also, configuration related information of a guest VM hosted on a source hypervisor may be accessible from the configuration file(s) associated with the guest VM. The configuration related information can be used and/or altered to create a configuration with similar attributes for creating a recovered guest VM hosted on any kind of destination hypervisor, irrespective of the source hypervisor originally hosting the guest VM.

The present disclosure thus includes, without limitation, the following example implementations.

Some example implementations provide a method of performing data recovery of a first virtual machine (VM) hosted on a first hypervisor to a second hypervisor that is different from the first hypervisor, the method comprising: identifying information indicating format of a first virtual disk in a backup of the first VM; creating a second virtual disk using the information indicating format of the first virtual disk; accessing information indicating configuration of the first VM and metadata of the first virtual disk; creating a second VM hosted on the second hypervisor using the information indicating configuration of the first VM and the metadata of the first virtual disk; and attaching the second virtual disk to the second VM.

In some example implementations of the method of any preceding example implementation, or any combination of preceding example implementations, the first hypervisor is one of Microsoft Hyper-V or VMware ESXi, and the second hypervisor is the other one of Microsoft Hyper-V or VMware ESXi.

In some example implementations of the method of any preceding example implementation, or any combination of preceding example implementations, identifying the information related to format of the first virtual disk includes: identifying a disk format of the first virtual disk; parsing format specification of the disk format of the first virtual disk; and identifying locations and types of data blocks in the first virtual disk using the format specification.

In some example implementations of the method of any preceding example implementation, or any combination of preceding example implementations, creating the second virtual disk includes creating metadata for the second virtual disk using the metadata of the first virtual disk.

In some example implementations of the method of any preceding example implementation, or any combination of preceding example implementations, creating the second virtual disk includes creating a second block allocation table (BAT) for the second virtual disk using a first BAT indicating locations and types of data blocks in the first virtual disk.

In some example implementations of the method of any preceding example implementation, or any combination of preceding example implementations, creating the second virtual disk includes mapping a data block in the first virtual disk to a corresponding data block in the second virtual disk using the second BAT.

In some example implementations of the method of any preceding example implementation, or any combination of preceding example implementations, the metadata of the first virtual disk includes at least a location of the first virtual disk attached to the first VM, a type of the first virtual disk, and a size of the first virtual disk.

Some example implementations provide an apparatus for performing data recovery of a first VM hosted on a first hypervisor to a second hypervisor that is different from the first hypervisor. The apparatus comprises a processor and a memory storing executable instructions that, in response to execution by the processor, cause the apparatus to at least perform the method of any preceding example implementation, or any combination of any preceding example implementations.

Some example implementations provide a computer-readable storage medium for performing data recovery of a first VM hosted on a first hypervisor to a second hypervisor that is different from the first hypervisor. The computer-readable storage medium is non-transitory and has computer-readable program code stored therein that in response to execution by a processor, causes an apparatus to at least perform the method of any preceding example implementation, or any combination of any preceding example implementations.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Figure 1:
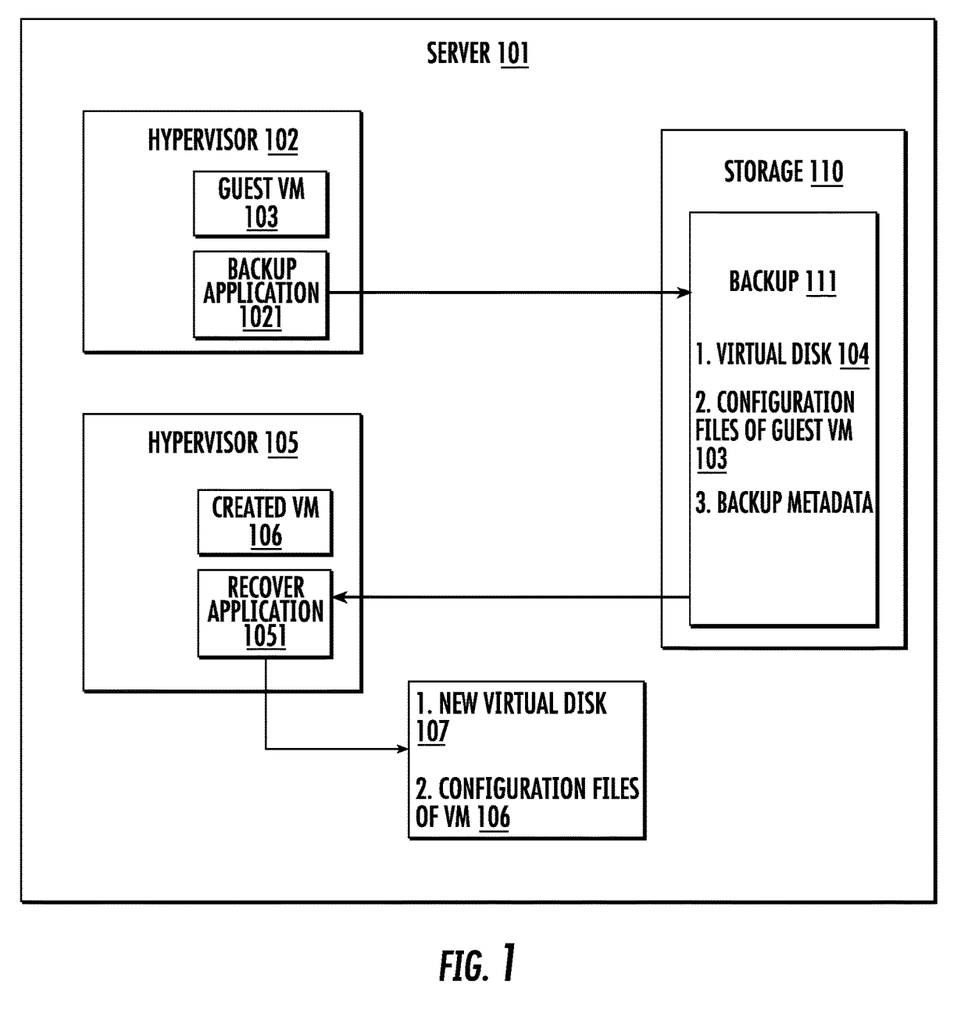
FIG. 1 illustrates a system for performing data recovery of a guest virtual machine (VM), according to example implementations of the present disclosure.

FIG. 1 illustrates a system or a server 101 for performing data recovery of a guest VM, according to example implementations of the present disclosure. In some examples, as described in greater detail with reference to FIG. 4, the system or server may be implemented by an apparatus that includes a processor and a memory storing executable instructions.

As shown in FIG. 1, in some implementations, the server 101 can support a source hypervisor 102 and a destination hypervisor 105. The source hypervisor can host a guest VM 103 and have a backup application 1021 installed on the source hypervisor. The backup application can generate a backup 111 of the guest VM. The backup of the guest VM can be stored in storage 110 of the server. The backup of the guest VM may include a virtual disk 104 including data of the guest VM, configuration files of the guest VM, and metadata of the backup. The virtual disk 104 may include data of the guest VM at the point of time that the backup or snapshot is taken. The metadata of the backup may be created during the backup operation performed by the backup application. The metadata of the backup may include details of various information of the backup and information such as type, format and/or brand of the source hypervisor.

A user may want to recover the guest VM 103 using the backup 111 of the guest VM. The user may desire that the recovered guest VM is hosted by the destination hypervisor 105, which is different from the source hypervisor 102. The destination hypervisor may have a recover application 1051 installed on the destination hypervisor. The recover application can perform data recovery of the guest VM hosted on the source hypervisor to the destination hypervisor. In some implementations, the source hypervisor is one of Microsoft Hyper-V or VMware ESXi, and the destination hypervisor is the other one of Microsoft Hyper-V or VMware ESXi. That is, a user can recover a backed up guest VM hosted on Microsoft Hyper-V to VMware ESXi or vice versa. However, as explained above, example implementations can allow a user to recover a backed up guest VM hosted on any kind of source hypervisor to any kind of different destination hypervisor.

In some implementations, the recover application 1051 is configured to identify information indicating format of the virtual disk 104 in the backup 111 of the guest VM 103. To identify information indicating format of the virtual disk, the recover application can access and/or extract information from the backup. For example, the recover application can access and/or extract information of the virtual disk 104, configuration files of the guest VM, and metadata of the backup stored in the backup.

In some implementations, to identify information indicating format of the virtual disk 104, the recover application 1051 is configured to identify a disk format of the virtual disk. For example, the recover application can identify that the disk format or type of the virtual disk is .vmdk or .vhd based on the accessed or extracted information from the backup 111 such as the metadata of the backup. The recover application is also configured to parse format specification of the disk format of the virtual disk. For example, the recover application can parse format specification of the disk format of the virtual disk to identify and extract information related to header, footer, and/or other useful information of the disk format of the virtual disk. After parsing the format specification of the disk format of the virtual disk, the recover application is further configured to identify locations and types of data blocks in the virtual disk using the format specification. For example, if the disk format of the virtual disk is .vhd, from the Block Allocation Table (BAT) in the format specification of the .vhd disk format, the recover application can identify locations (e.g., offsets of the data blocks) and types (e.g., data or metadata) of data blocks in the virtual disk. In one example, the format specification can be included in a document that may help the recover application understand the information stored in the header, the footer, and/or other sections of the virtual hard disk 104.

In some implementations, the recover application 1051 is configured to create a new virtual disk 107 using the information indicating format of the virtual disk 104. To create the new virtual disk 107, in some implementations, the recover application is configured to create metadata for the new virtual disk 107 using the metadata of the virtual disk 104. The metadata of the virtual disk 104 can be accessed and/or extracted from the backup 111 such as from the metadata of the backup. The recover application is also configured to create a new BAT for the new virtual disk 107 using the BAT indicating locations and types of data blocks in the virtual disk 104. As explained above, the BAT indicating locations and types of data blocks in the virtual disk 104 may be in the format specification of the disk format of the virtual disk 104. The recover application is further configured to map a data block in the virtual disk 104 to a corresponding data block in the new virtual disk 107 using the created new BAT. The created new virtual disk 107 may have the disk format supported by the destination hypervisor 105. For example, the virtual disk 104 may have the format of .vhd, and the created new virtual disk 107 may have the format of .vmdk and include the data of the virtual disk 104. That is, the new virtual disk 107 can be a recovered version of the virtual disk 104 in a different disk format. Creating the new virtual disk 107 using the information indicating format of the virtual disk 104 will be described in detail below.

After the new virtual disk 107 is created, the recover application 1051 can create a new VM hosted on the destination hypervisor 105 such that the new virtual disk 107 can be attached to the new VM to complete the data recovery process. In some implementations, the recover application is configured to access information indicating configuration of the guest VM 103 and metadata of the virtual disk 104. The information indicating configuration of the guest VM may include the configuration files of the guest VM stored in the backup 111. The metadata of the virtual disk 104 may be included in the metadata of the backup stored in the backup 111. In some implementations, the metadata of the virtual disk 104 includes at least a location of the virtual disk 104 attached to the guest VM, a type of the virtual disk 104, and a size of the virtual disk 104.

After accessing the information indicating configuration of the guest VM 103 and metadata of the virtual disk 104, in some implementations, the recover application 1051 is configured to create a new VM 106 hosted on the destination hypervisor 105 using the information indicating configuration of the guest VM and the metadata of the virtual disk. In on example, the recover application can generate configuration files for the new VM 106 with similar attributes as the configuration of the guest VM 103, based on the configuration files of the guest VM stored in the backup 111. In some implementations, the recover application 1051 is configured to attach the new virtual disk 107 to the new VM 106. Thus, the guest VM 103 hosted on the source hypervisor 102 can be recovered as the new VM 106 with the new virtual disk 107 attached. The new VM 106 is hosted on the destination hypervisor 105. The new virtual disk 107 has a format compatible with the destination hypervisor. In one example, a user may indicate the path to store the recovered VM 106 on the destination hypervisor, such that the VM 106 and the attached virtual disk 107 can be created according to the path indicated by the user. If no path is given by the user, the VM 106 and the attached virtual disk 107 can be created according to a default path or location on the destination hypervisor.

In other examples, the source hypervisor 102 may host multiple guest VMs. The backup application 1021 can generate a respective backup for each of the multiple guest VMs hosted on the source hypervisor. The respective backup can include multiple virtual disks. The recover application 1051 can create a respective new virtual disk for each of the multiple virtual disks, and can create a respective new VM for each of the multiple guest VMs, similarly as described above. The recover application can recover each of the backed up guest VMs to the destination hypervisor 105, similarly as described above.

The server 101 may include any of a number of different subsystems (each an individual system) for performing one or more functions or operations as described herein. The subsystems may be co-located or directly coupled to one another, or in some examples, various ones of the subsystems may communicate with one another across one or more computer networks. It should also be understood that the server may include one or more additional or alternative subsystems than those shown in FIG. 1. For example, the server 101 can include server hardware such as CPU, memory, network interface controller (NIC), hard disk and/or other hardware components. With the server hardware, the server can support one or more hypervisors such as the hypervisors 102 and 105. In one example, the server 101 can be deployed in a cloud environment as a server of a cloud service provider.

In one example, using a graphical user interface (GUI) of the server 101 to which both backup application 1021 and recover application 1051 are registered, when a user initiates a recovery of a guest VM 103 hosted on the source hypervisor 102 to the destination hypervisor 105, the recover application 1051 on the destination hypervisor can be initiated. The recover application can enquire the details of the backup 111 of the guest VM stored in the storage 110 of the server. When the recover application finds that the backup 111 is for a guest VM 103 hosted on the source hypervisor, the recover application can recreate the data (e.g., the virtual disk) in the backup 111 in a format that is compatible with the destination hypervisor.

In one example, the source hypervisor 102 is a VMware ESXi hypervisor hosting the guest VM 103. The backup application 1021 can generate a backup 111 of the guest VM. At the completion of backup, the server 101 can store information including configuration files (.vmx) of the guest VM, one or more virtual hard disks such as the virtual disk 104 in the format of .vmdk, and backup related metadata information. The user may want to recover the backed up guest VM to a Microsoft Hyper-V destination hypervisor 105. The following data are needed to recover the backed up guest VM to the Microsoft Hyper-V destination hypervisor: one or more compatible virtual hard disks such as the virtual disk 107 in the format of .vhd or .vhdx, the configuration files (.xml) of the new VM 106.

In the above example, the recover application 1051 can identify the data sectors and/or blocks in the backed up virtual disk 104 and create the new virtual disk 107 on the destination hypervisor using the identified data sectors and/or blocks. The recover application can understand and implement the format specification of the disk format (e.g., .vmdk) compatible with the source hypervisor and the format specification of the disk format (e.g., vhd or .vhdx) compatible with the destination hypervisor. The recover application can also use the information in the backed up configuration files (.vmx) of the guest VM 103 to generate configuration files (.xml) of the new VM 106. The recover application can use application programming interfaces (APIs) on the destination hypervisor to configure the new VM 106 using the generated configuration files (.xml). The new VM 106 may have a configuration with similar attributes as the configuration of the guest VM 103 and is hosted by the Microsoft Hyper-V destination hypervisor 105.

In one example, during the recovery, the user may specify a disk format (e.g., .vhd or .vhdx) compatible with the destination hypervisor 105. The recover application 1051 can first perform a data conversion process by leveraging the format specification of the disk format compatible with the source hypervisor 102 and the format specification of the disk format compatible with the destination hypervisor. The recover application can use the attributes in the metadata of the first virtual disk 104 to create the metadata for the new virtual disk 107.

In one example, the format specification of the disk format compatible with the source hypervisor 102 may help the recover application 1051 understand one or more of the following information: header that contains information such as the disk version, unique ID, parent disk information; footer that contains information such as the sector size, total disk size, block unit information; BAT (Block Allocation Table) that contains information such as the location (e.g., offsets) and type (e.g., data, metadata) of the various initialized data blocks; bitmap that indicates sectors in a particular data block are valid or not; and data blocks that are used to divide the entire virtual disk into parts which store specific information. Some of the information of metadata of the virtual disk 104, e.g., the disk size of the virtual disk 104, the footer of the virtual disk 104, can be used by the recover application 1051 for creating the metadata for the new virtual disk 107. There are many attributes that are specific to a certain hypervisor. For example, the destination hypervisor may have a Unique ID associated with each data block, and the source hypervisor may not have such a Unique ID associated with each data block. In this example, the recover application can use a default value for the Unique ID as initiated by the destination hypervisor when creating the metadata for the new virtual disk 107. The recover application can create the new virtual disk 107 in a format (e.g., .vhd or .vhdx) compatible with the destination hypervisor, using the metadata for the new virtual disk 107.

In one example, after creating the virtual disk 107, the recover application 1051 can start adding data to the virtual disk 107. The recover application can use the BAT indicating locations and types of data blocks in the virtual disk 104 to identify the data blocks and their locations (offsets and length) and types in the virtual disk 104. The recover application can create a new BAT for the new virtual disk 107 using the BAT indicating locations and types of data blocks in the virtual disk 104. The recover application can map a data block in the virtual disk 104 to a corresponding data block at a particular location in the virtual disk 107, and then update the new BAT with the information of the data blocks and their locations and types in the new virtual disk 107. Each valid data block in the virtual disk 104 can be mapped to a corresponding data block in the new virtual disk 107.

In one example, if there is a mismatch between in the size of the virtual disk 104 and the size of the new virtual disk 107, the recover application 1051 can still map the data blocks. For example, the unit size of each data block in the virtual disk 104 may be 2 MB. However, the new virtual disk 107 may support only 10 MB blocks. If the virtual disk 104 includes 100 blocks (e.g., disk size: 200 MB), the new virtual disk 107 may only require 20 blocks to store the information of the 100 blocks in the virtual disk 104. The recover application can aggregate the data blocks of the virtual disk 104 into contiguous locations so that data from 5 data blocks on the virtual disk 104 can be merged to create a single data block on the virtual disk 107. The virtual disk 107 may only need 20 BAT table entries in the created BAT for the virtual disk 107, as opposed to 100 entries in the BAT for the virtual disk 104. In this way, although the block size is different between the virtual disk 104 and new virtual disk 107, the data blocks in the virtual disk 104 can still be mapped to the virtual disk 107 and be recovered in in a format compatible with the destination hypervisor 105.

In one example, after the data conversion is complete, the recover application 1051 can recover the newly created virtual disk 107 to the destination hypervisor 105. To do so, the recover application can create a new VM 106 hosted by the destination hypervisor such that the new virtual disk 107 can be attached to it. The recover application may need certain configuration details as well as key data points in the creation of the new VM 106. In one example, the recover application can gather virtual disk metadata of the virtual disk 104. The virtual disk metadata may be stored in the header and/or footer of the virtual disk 104. The recover application can also gather information from the configuration files of the guest VM 103 and the information available in metadata of the backup 111 of the guest VM.

In one example, the metadata files of the backup 111 are stored as part of the backup. During a recovery, the metadata files of the backup can be accessed and information stored in the metadata files of the backup can be stored in memory as a data structure. This data structure can then be used to supply information when the new VM 106 is to be created on the destination hypervisor 105. The metadata files stored in the storage 110 of the server 101 corresponding to the last backup may supply information such as RAM and CPU allocated to the guest VM; networking related information; number of virtual disks in the guest VM 103. When the recover application 1051 needs to create the new VM 106 on the destination hypervisor as part of the recovery, the recover application may need different parameters to create similar information such as RAM and CPU allocated to the new VM 106; networking related information; number of virtual disks in the new VM 106. The metadata files of the backup 111 can be used to create the similar information during the creation of the VM 106.

Based on the information gathered, the recover application 1051 can create the new VM 106 hosted on the destination hypervisor 105. After the new VM 106 is created, the recover application can attach the newly created virtual disk 107 to the new VM 106. The newly created virtual disk 107 is in a format compatible with the destination hypervisor, and the new VM 106 is hosted on the destination hypervisor. Thus, the backed up guest VM 103 can be recovered with a format compatible with the destination hypervisor and hosted on the destination hypervisor.

Figure 2:
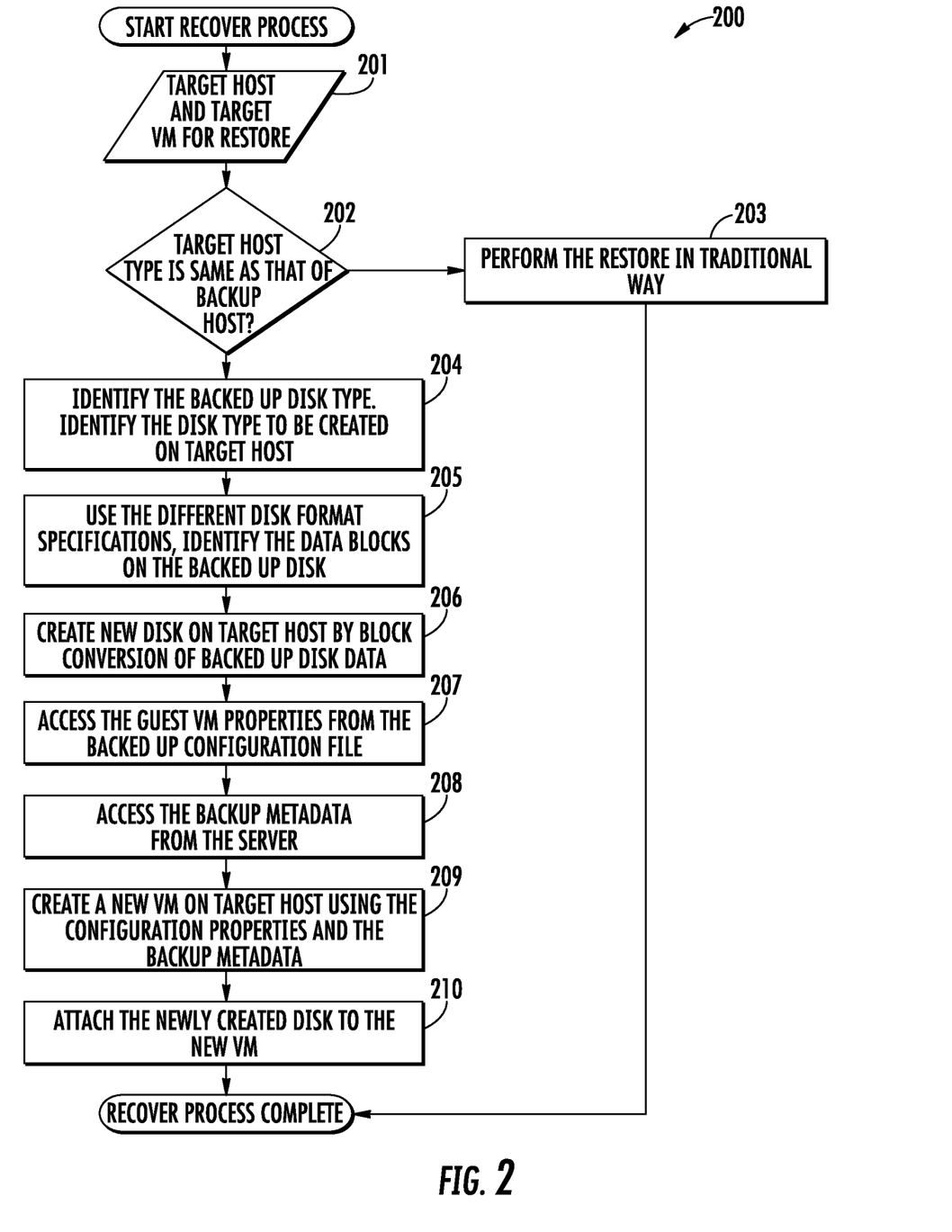
FIG. 2 illustrates a flowchart of performing data recovery of a guest VM hosted on a source hypervisor to a destination hypervisor, according to various example implementations.

FIG. 2 illustrates a flowchart 200 of performing data recovery of a guest VM hosted on a source hypervisor to a destination hypervisor, according to various example implementations. As shown, at block 201, the recover application 1051 can identify the destination hypervisor 105 (i.e., target host). At block 202, the recover application can determine whether the destination hypervisor and the source hypervisor 102 (i.e., backup host) are the same type. If the destination hypervisor and the source hypervisor are the same type, e.g., both are Microsoft Hyper-V hypervisors, at block 203, the recover application can perform traditional data recovery. For example, the recover application can recover the guest VM 103 hosted by a Microsoft Hyper-V hypervisor to another Microsoft Hyper-V hypervisor.

On the other hand, if destination hypervisor 105 and the source hypervisor 102 are not the same type, format or brand, e.g., the destination hypervisor is a VMware ESXi hypervisor and the source hypervisor is a Microsoft Hyper-V hypervisor, the flowchart 200 proceeds to block 204. At block 204, the recover application 1051 can identify the backed up disk type or format (e.g., .vhd or v.vhdx) of the virtual disk 104 based on the accessed or extracted information from the backup 111 such as the metadata of the backup. The recover application can also identify the disk type or format (e.g., .vmdk) of the virtual disk 107 that is to be created. The disk type of the virtual disk 107 may be compatible with the destination hypervisor.

At block 205, the recover application 1051 can identify data blocks and locations and types of data blocks in the virtual disk 104 using the format specification such as the information in the BAT for the virtual disk 104, as described above. At block 206, the recover application can create the new virtual disk 107 by performing the block or data conversion process as described above. For example, the recover application can create metadata for the virtual disk 107 using the metadata of the virtual disk 104, and can create a new BAT for the virtual disk 107 using the BAT indicating locations and types of data blocks in the virtual disk 104. The recover application can map a data block in the virtual disk 104 to a corresponding data block in the virtual disk 107 using the new BAT. The virtual disk 107 may have the format of .vmdk and include the data of the virtual disk 104. That is, the new virtual disk 107 can be a recovered version of the virtual disk 104 in a different disk format that is compatible with the destination hypervisor.

At block 207, the recover application 1051 can access and/or extract properties or attributes of the guest VM 103 from the configurations files in the backup 111 of the guest VM from the storage 110 of the server 101. At block 208, the recover application can access and/or extract metadata of the backup 111 from the storage of the server. At block 209, the recover application can create the new VM 106 hosted by the destination hypervisor using the accessed or extracted configuration properties from the configurations files and the metadata of the backup. The new VM 106 may have similar configuration or attributes as the configuration or attributes of the guest VM 103. At block 210, the recover application can attach the new virtual disk 107 to the new VM 106. Thus, the backed up guest VM 103 can be recovered with a format compatible with the destination hypervisor 105 and hosted on the destination hypervisor.

Figure 3:
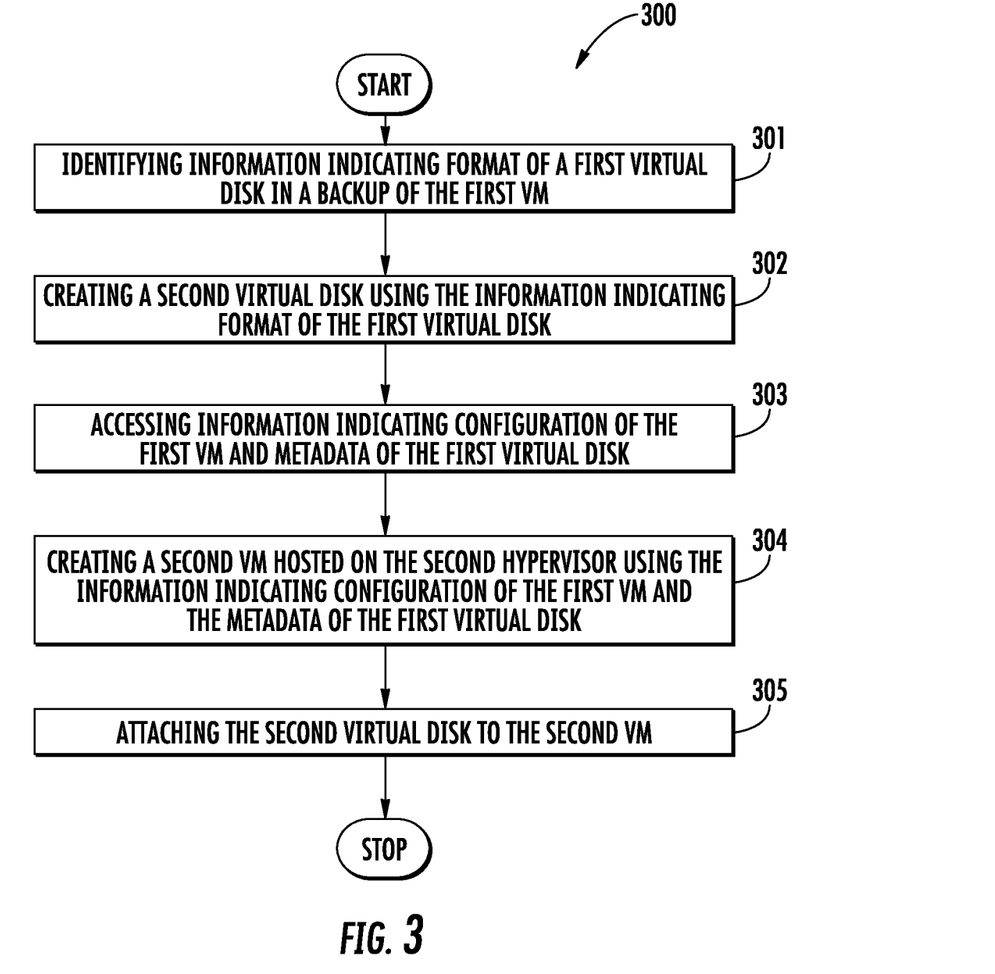
FIG. 3 is a flowchart illustrating various operations in a method of performing data recovery of a guest VM, according to various example implementations.

FIG. 3 is a flowchart illustrating various operations in a method 300 of performing data recovery of a first VM 103 hosted on a first hypervisor 102 to a second hypervisor 105 that is different from the first hypervisor, according to various example implementations. At block 301, the method includes identifying information indicating format of a first virtual disk 104 in a backup 111 of the first VM. At block 302, the method includes creating a second virtual disk 107 using the information indicating format of the first virtual disk. At block 303, the method includes accessing information indicating configuration of the first VM and metadata of the first virtual disk. At block 304, the method includes creating a second VM 106 hosted on the second hypervisor using the information indicating configuration of the first VM and the metadata of the first virtual disk. At block 305, the method includes attaching the second virtual disk to the second VM.

Figure 4:
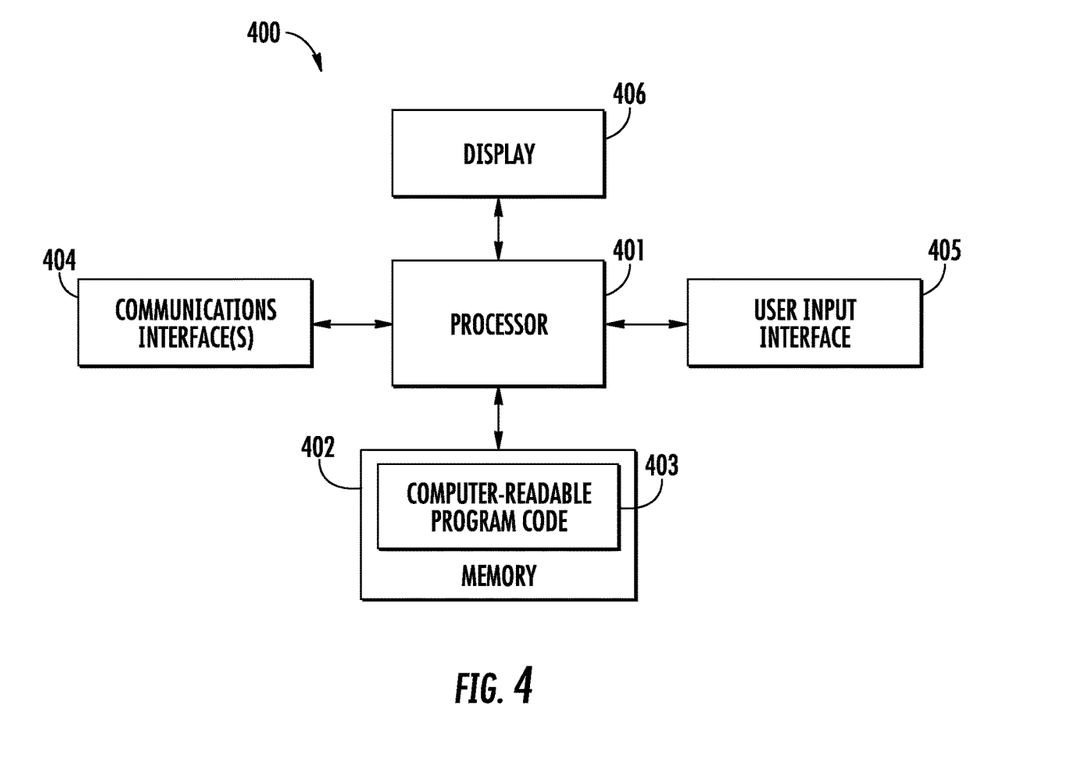
FIG. 4 illustrates an apparatus according to some example implementations.

FIG. 4 illustrates an apparatus 400 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 401 (e.g., processing circuitry) connected to a memory 402 (e.g., storage device). In some examples, the apparatus 400 implements the server or system 101.

The processor 401 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 402 (of the same or another apparatus).

The processor 401 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 402 is generally any piece of computer hardware that is capable of storing information such as, for example, data, computer programs (e.g., computer-readable program code 403) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 402, the processor 401 may also be connected to one or more interfaces for displaying, transmitting and/or receiving information. The interfaces may include a communications interface 404 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 406 and/or one or more user input interfaces 405 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 400 may include a processor 401 and a computer-readable storage medium or memory 402 coupled to the processor, where the processor is configured to execute computer-readable program code 403 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of performing data recovery of a first virtual machine (VM) hosted on a first hypervisor to a second hypervisor that has one of a different type, format, and a brand from the first hypervisor, the method comprising:
  identifying information indicating format of a first virtual disk in a backup of the first VM, the backup of the first VM being generated by a backup application installed on the first hypervisor, the first hypervisor including a source hypervisor, wherein the first and the second hypervisors are within a server;
  creating a second virtual disk using the information indicating format of the first virtual disk, wherein creating the second virtual disk includes mapping, by a recover application installed on the second hypervisor, data block in the first virtual disk to a corresponding data block in the second virtual disk, wherein creating the second virtual disk includes creating metadata for the second virtual disk using metadata of the first virtual disk, and wherein creating the metadata for the second virtual disk includes:
  initiating, by the second hypervisor, a unique ID associated with each data block,
  determining that the source hypervisor has the unique ID associated with each data block, and
  in response to determining that the source hypervisor has the unique ID associated with each data block, assigning a default value based on the unique ID associated with each data block;
accessing information indicating configuration of the first VM and the metadata of the first virtual disk, wherein information of the first VM hosted on the first hypervisor is accessible from one or more configuration files stored in the backup of the first VM, the one or more configuration files including data to generate configuration files of a second VM, wherein the metadata of the first virtual disk includes information of processing resources allocated to the first VM, the metadata of the first virtual disk being stored in one of a header or a footer of the first virtual disk;
creating the second VM hosted on the second hypervisor using the information indicating configuration of the first VM and the metadata of the first virtual disk, the second VM having similar attributes as the first VM; and
attaching the second virtual disk to the second VM.

2. The method of claim 1, wherein the first hypervisor is one of Microsoft Hyper-V or VMware ESXi, and the second hypervisor is the other one of Microsoft Hyper-V or VMware ESXi.

3. The method of claim 1, wherein identifying the information indicating format of the first virtual disk includes:
  identifying a disk format of the first virtual disk;
  parsing format specification of the disk format of the first virtual disk to identify and extract information related to the header, the footer, or other information of the disk format of the first virtual disk; and
  identifying locations and types of data blocks in the first virtual disk using the format specification.

4. The method of claim 1, wherein creating the second virtual disk includes creating a second block allocation table (BAT) for the second virtual disk using a first BAT indicating locations and types of data blocks in the first virtual disk.

5. The method of claim 1, wherein mapping the data block in the first virtual disk to the corresponding data block in the second virtual disk includes aggregating the data block of the first virtual disk into contiguous locations if there is a mismatch between a size of the first virtual disk and a size of the second virtual disk.

6. The method of claim 1, wherein the metadata of the first virtual disk includes at least a location of the first virtual disk attached to the first VM, a type of the first virtual disk, and a size of the first virtual disk.

7. The method of claim 1, further comprising:
  determining that the second hypervisor and the first hypervisor are not a same type.

8. The method of claim 1, wherein the similar attributes include a random-access memory (RAM) allocated to the second VM, networking related information, and a number of virtual disks in the second VM.

9. The method of claim 1, wherein the metadata of the first virtual disk is extracted from metadata of a backup created during a backup operation performed by the backup application.

10. The method of claim 1, wherein the recover application on the second hypervisor is initiated using a graphical user interface (GUI) of the server to which the backup application and the recover application are registered.

11. The method of claim 1, wherein the second VM is configured, based on the one or more configuration files, by the recover application using application programming interfaces (APIs) on the second hypervisor.

12. An apparatus for performing data recovery of a first virtual machine (VM) hosted on a first hypervisor to a second hypervisor that has one of a different type, format, and a brand from the first hypervisor, the apparatus comprising a processor and a memory storing executable instructions that, in response to execution by the processor, cause the apparatus to at least:
  identifying information indicating format of a first virtual disk in a backup of the first VM, the backup of the first VM being generated by a backup application installed on the first hypervisor, the first hypervisor including a source hypervisor, wherein the first and the second hypervisors are within a server;
  creating a second virtual disk using the information indicating format of the first virtual disk, wherein creating the second virtual disk includes mapping, by a recover application installed on the second hypervisor, data block in the first virtual disk to a corresponding data block in the second virtual disk, wherein creating the second virtual disk includes creating metadata for the second virtual disk using metadata of the first virtual disk, and wherein creating the metadata for the second virtual disk includes:
    initiating, by the second hypervisor, a unique ID associated with each data block,
    determining that the source hypervisor has the unique ID associated with each data block, and
    in response to determining that the source hypervisor has the unique ID associated with each data block, assigning a default value based on the unique ID associated with each data block;
  accessing information indicating configuration of the first VM and metadata of the first virtual disk, wherein information of the first VM hosted on the first hypervisor is accessible from one or more configuration files stored in the backup of the first VM, the one or more configuration files including data to generate configuration files of a second VM, wherein the metadata of the first virtual disk includes information of processing resources allocated to the first VM, the metadata of the first virtual disk being stored in one of a header or a footer of the first virtual disk;
  creating the second VM hosted on the second hypervisor using the information indicating configuration of the first VM and the metadata of the first virtual disk, the second VM having similar attributes as the first VM; and
  attaching the second virtual disk to the second VM.

13. The apparatus of claim 12, wherein the first hypervisor is one of Microsoft Hyper-V or VMware ESXi, and the second hypervisor is the other one of Microsoft Hyper-V or VMware ESXi.

14. The apparatus of claim 12, wherein the apparatus being caused to identify the information indicating format of the first virtual disk includes being caused to:
  identify a disk format of the first virtual disk;
  parse format specification of the disk format of the first virtual disk; and
  identify locations and types of data blocks in the first virtual disk using the format specification.

15. The apparatus of claim 12, wherein the apparatus being caused to create the second virtual disk includes being caused to create a second block allocation table (BAT) for the second virtual disk using a first BAT indicating locations and types of data blocks in the first virtual disk.

16. The apparatus of claim 12, wherein the apparatus being caused to map the data block in the first virtual disk to the corresponding data block in the second virtual disk includes being caused to aggregate the data block of the first virtual disk into contiguous locations if there is a mismatch between a size of the first virtual disk and the size of the second virtual disk.

17. The apparatus of claim 12, wherein the metadata of the first virtual disk includes at least a location of the first virtual disk attached to the first VM, a type of the first virtual disk, and a size of the first virtual disk.

18. A computer-readable storage medium for performing data recovery of a first virtual machine (VM) hosted on a first hypervisor to a second hypervisor that has one of a different type, format, and a brand from the first hypervisor, the computer-readable storage medium being non-transitory and having computer-readable program code stored therein that in response to execution by a processor, causes an apparatus to at least:
  identify information indicating format of a first virtual disk in a backup of the first VM, wherein the first and the second hypervisors are within a server;
  create second virtual disk using the information indicating format of the first virtual disk, wherein to create the second virtual disk includes to map, by a recover application installed on the second hypervisor, a data block in the first virtual disk to a corresponding data block in the second virtual disk, wherein to create the second virtual disk includes creating metadata for the second virtual disk using metadata of the first virtual disk, and wherein creating the metadata for the second virtual disk includes:
    initiating, by the second hypervisor, a unique ID associated with each data block,
    determining that the source hypervisor has the unique ID associated with each data block, and
    in response to determining that the source hypervisor has the unique ID associated with each data block, assigning a default value based on the unique ID associated with each data block;
  access information indicating configuration of the first VM and metadata of the first virtual disk, wherein information of the first VM hosted on the first hypervisor is accessible from one or more configuration files stored in the backup of the first VM, the one or more configuration files including data to generate configuration files of a second VM, wherein the metadata of the first virtual disk includes information of processing resources allocated to the first VM, the metadata of the first virtual disk being stored in one of a header or a footer of the first virtual disk;
  create the second VM hosted on the second hypervisor using the information indicating configuration of the first VM and the metadata of the first virtual disk; and
  attach the second virtual disk to the second VM.

19. The computer-readable storage medium of claim 18, wherein the first hypervisor is one of Microsoft Hyper-V or VMware ESXi, and the second hypervisor is the other one of Microsoft Hyper-V or VMware ESXi.

20. The computer-readable storage medium of claim 18, wherein the apparatus being caused to identify the information indicating format of the first virtual disk includes being caused to:
  identify a disk format of the first virtual disk;
  parse format specification of the disk format of the first virtual disk; and
  identify locations and types of data blocks in the first virtual disk using the format specification.

21. The computer-readable storage medium of claim 18, wherein the apparatus being caused to create the second virtual disk includes being caused to create a second block allocation table (BAT) for the second virtual disk using a first BAT indicating locations and types of data blocks in the first virtual disk.

22. The computer-readable storage medium of claim 18, wherein the apparatus being caused to map the data block in the first virtual disk to the corresponding data block in the second virtual disk includes being caused to aggregate the data block of the first virtual disk into contiguous locations if there is a mismatch between a size of the first virtual disk and the size of the second virtual disk.

* * * * *